United States Patent [19]

Di Loreto

[11] 4,039,231

[45] Aug. 2, 1977

[54] BALL BEARING ASSEMBLY

[75] Inventor: Edward Di Loreto, Downey, Calif.

[73] Assignee: Yale Engineering Company, Downey, Calif.

[21] Appl. No.: 666,443

[22] Filed: Mar. 12, 1976

[51] Int. Cl.² .................................... F16C 33/58
[52] U.S. Cl. ........................... 308/189 R; 308/195; 308/216
[58] Field of Search .............. 308/188, 189 R, 198, 308/216, 235, 189, 195

[56] References Cited

U.S. PATENT DOCUMENTS

| 1,308,522 | 7/1919 | Delmar | 308/198 |
| 3,552,812 | 1/1971 | Howe, Jr. | 308/189 R |

Primary Examiner—Richard A. Bertsch
Attorney, Agent, or Firm—Dominick Nardelli

[57] ABSTRACT

A ball bearing assembly has an inner and an outer race ring. One of the race rings, preferably the inner race ring, is formed with one side wall relieved, i.e., a somewhat cylindrical surface is formed that is tangent to the torus surface forming the ball race surface. The somewhat cylindrical surface is made to extend to a slightly tapered surface with its apical adjacent to the end of the race ring. At the region where the tapered surface joins with the cylindrical surface, the tapered surface has a slightly greater diameter, forming a radially directed shoulder. The bearing is assembled by placing the balls within the outer race and the inner race is snapped into position. The taper is so designed that the metal at the shoulder yields to allow the balls to pass into the race surface; however, if any of the metal should deform, a circumferential groove is formed just inside the shoulder into which the deformed metal flows where it does not degrade the hardened polished ball race surface. To further insure a unitized assembly, a cylindrical land surface is formed between the groove and tapered surfaces.

6 Claims, 3 Drawing Figures

U.S. Patent    Aug. 2, 1977    4,039,231
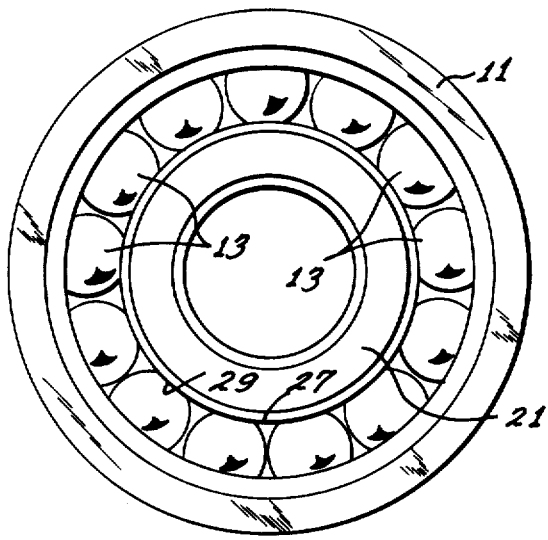
Fig.1
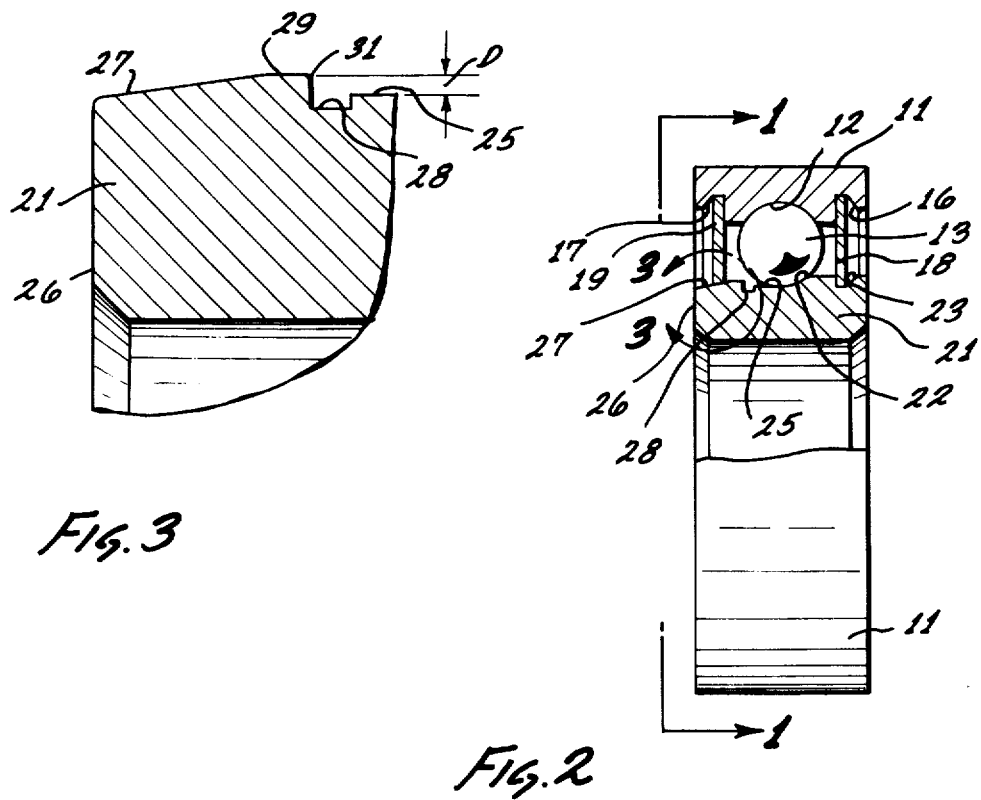
Fig.3
Fig.2

BALL BEARING ASSEMBLY

FIELD OF THE INVENTION

This invention relates to a ball bearing assembly and, more particularly, to a ball bearing assembly containing the maximum complements of balls.

BACKGROUND OF THE INVENTION

In the past, many procedures were devised to allow one to install the maximum complement of balls into a ball bearing assembly. One method was to relieve or cut away one side wall of one or both race rings. This was permissible because the other side of the race ring takes substantially all the load, which has both radial and axial components. A local cut-out in the race allows the bearing to remain substantially intact during shipment, but the rotational balance of the bearing is affected. A circumferential relief in one race to allow the race to maintain its rotational balance cannot keep the bearing balls or races intact during shipment and installation.

In other kinds of ball bearing assemblies, the relieved side of the raceway is not relieved all the way so as to be tangent to the torus surface forming the roll race surface. In these bearings, special heating a cooling techniques must be employed to permit insertion of the desired ball complements if the assembly is to be unit handled.

Another method is disclosed in U.S. Pat. No. 3,552,812 wherein a liner of resilient material is installed in the circumferential relieved side wall of the race ring. The resilient material deflects upon assembly of the races and balls. This forms a unit handling relationship for the ball bearing assembly. This method is obviously not suited in high temperature operations because the high temperature could cause the resilient material to flow.

OBJECTS OF THE INVENTION

An object of this invention is to provide an improved ball bearing assembly with the maximum complement of balls.

Another object of this invention is to include into the above object a construction which allows unit handling of the bearing without resorting to special heating or cooling techniques.

Another object of this invention is to provide an improved ball bearing assembly which lends itself to efficient low cost production of a precision product.

These and other objects and features of advantage will become more apparent after one studies the following detailed description of the preferred embodiment of my invention, together with the appended drawings.

BRIEF DESCRIPTION OF THE DRAWINGS:

FIG. 1 is a face view of my novel ball bearing assembly shown without the dust seals, and taken on line 1—1 of FIG. 2.

FIG. 2 is a side view of the ball bearing assembly shown in partial section.

FIG. 3 is an enlarged section of the portion of the inner race ring enclosed by circle 3—3 of FIG. 2.

DETAILED DESCRIPTION OF THE DRAWINGS

The ball bearing assembly, as shown in the drawing, is one embodiment of my invention. In this embodiment, the assembly is shown with a standard outer race ring 11 which has an interior concave torus-like race surface 12 on which standard ball bearings 13 roll. Naturally, surface 12 only forms part of a torus-like surface. The outer race 11 has a pair of internal circumferential grooves 16 and 17 into which are snapped suitable dust seals 18 and 19, respectively, in a standard manner. As one can see, the outer race in the embodiment described is substantially the same as in any standard ball bearing with dust seals.

My invention provides a modified inner race ring 21 which also has a race surface 22 on which bearing balls 13 roll. Of course, the race surface 22 is formed on the external surface of race 21. The right side of the inner race 21, as viewed in FIG. 2, is made in the conventional manner in that the race surface 22 curves outwardly from the axis, with a suitable external circumferential groove 23 formed thereon to receive the dust seal 18. The opposite side of the inner race 21, the left side as viewed in FIG. 2 or the near side as viewed in FIG. 1, is formed so that a substantially cylindrical surface 25 is formed tangent to the race surface 22 at the circle of least diameter. As shown in FIG. 3, the cylindrical surface 25 does not extend to an end surface 26 of the inner race ring, but a slightly conical surface 27 is formed near end surface 26 in which conical surface the diameter increases slightly as it extends inwardly. For example, the diameter of the conical surface 27 at the end surface 26 is the same or less than the diameter of surface 25. The diameter of the conical surface 27 increases inwardly so that it is larger than the diameter of surface 25 by an amount as represented by the letter D. In a production bearing, the diameter of cylindrical surface 25 is made 0.446 inch and the dimension D is made 0.006 inch. Between conical surface 27 and cylindrical surface 25 is formed a circumferential groove 28, for reasons that will become apparent hereinafter. In addition, for reasons that also will be explained hereinafter, a cylindrical land surface 29 is formed between conical surface 27 and groove 28. In the above mentioned production bearing assembly, the axial length of both the groove 28 and land 29 is, for example, 0.010 inch. the clearance between the right edge 31 of land 29 as viewed in FIG. 3 and the balls 13 is about a few thousanths of an inch. This clearance is held relatively small so that the axial play between the inner and outer race is also relatively small. In the above-mentioned production bearing, the outside diameter of the outer race was approximately ⅝ of an inch.

The bearing is assembled by first placing the outer race 11 on a suitable fixture (not shown) which has a rod axially disposed therethrough. Now the correct complements of bearing balls 13 are placed between the race ring 11 and the rod. The rod is removed at the same time the inner race is moved into position within the outer race ring. Of course, end surface 26 is first guided into the outer race ring. Because of the size of the conical surface 27, the balls 13 are held firmly against race ring 12. As the inner race 22 is further forced into the outer race, the concave surface 27 interferes with the balls 13, whereby the surfaces 27 and 29 yield and may also deform to allow the balls 13 to make contact with race surface 22, as shown in FIG. 2. Any deformed metal in the race ring 21 flows into the groove 28 because of the movement of the balls 13. This deformed metal, being disposed and held within the groove 28, is not in a position where it can degrade the balls 13 and race surfaces 12 and 22 as the balls roll. I have found that by forming the cylindrical land surface 29 instead of forming the conical surface to edge 31, the assembly maintains its assembled unit relationship better during handling. The axial length of land 29 should be minimal so as not to form possible scratches on the ball, as the balls are forced thereacross, but of sufficient axial length to prevent separation of the races. Further, to aid in the assembly, the portion of the inner race ring where surfaces 27 and 29 are located may be annealed before assembly while the race surface 22 may be hardened in a standard manner.

One can see that the novel features which I have applied to the inner rings can readily be adapted to the outer race by one skilled in the art after studying the above disclosure. Therefore, my invention is not to be considered as limited to the disclosed embodiment, but includes all embodiments falling within the scope of the appended claims.

I claim:

1. A ball bearing assembly comprising:
   an outer race ring and an inner race ring having opposing ball race surfaces;
   balls disposed within said raceway surfaces supporting said rings in a radially spaced relation;
   one of said race rings having a substantially cylindrical surface extending axially from one side of said respective race surface and tangent thereto,
   said one of said race rings having a conical surface disposed between said cylindrical surface and the respective axial end of said one race ring;
   said conical surface having a diameter of such a size at its inner end to cause an interference between said conical surface and said balls;
   said one race ring having a circumferential groove formed between said cylindrical surface and said conical surface.

2. The assembly of claim 1 wherein:
   said one race ring has a cylindrical land surface formed between said conical surface and said circumferential groove.

3. The assembly of claim 1 wherein:
   said one race ring is the inner race ring.

4. The assembly of claim 3 wherein:
   said conical surface has a larger diameter at is inner end than the diameter of said cylindrical surface.

5. The assembly of claim 4 wherein:
   said inner race ring has a circumferential groove formed between said cylindrical surface and said conical surface.

6. The assembly of claim 5 wherein:
   said inner race ring has a cylindrical land surface formed between said conical surface and said circumferential groove.

* * * * *